United States Patent Office 2,901,440

Patented Aug. 25, 1959

2,901,440

CATALYST FOR HYDROCARBON CONVERSION REACTIONS

Charles P. Wilson, Cincinnati, Ohio, assignor to W. R. Grace & Co., New York, N.Y., a corporation of Connecticut No Drawing. Application March 23, 1956
Serial No. 573,348

8 Claims. (Cl. 252—441)

This invention relates to a novel catalyst suitable for hydrocarbon conversion reactions. In one specific aspect, it relates to a novel improved silica-magnesia catalyst and its method of manufacture.

The prior art is replete with methods for preparing suitable catalysts to facilitate cracking operations. It was known long ago that synthetic porous solids comprising silica and a metal oxide could be contacted with a mineral or petroleum oil at elevated temperatures to produce lower boiling fractions of hydrocarbons. The suitability of such synthetic catalysts depends on both the metal oxide selected and the method of combining this metal oxide with silica. Silica-magnesia catalysts have been found to be useful for cracking purposes. The methods of preparing these catalysts are quite varied; no one catalyst has properties equal to that of another. It has long been the aim of prior art investigators to prepare a silica-magnesia catalyst that is excellent in all respects, since this particular type of catalyst gives an increased yield of hydrocarbons in the gasoline boiling range.

The excellence of a particular catalyst is measured in terms of its performance during the cracking operation. Good catalysts are not easily attritable; they form only a modicum of fines during the cracking operation. They show good equilibrium activity and high steam and thermal stability. Such catalysts are readily reactivated by calcination treatment to remove carbon deposited on their surfaces. Heretofore, no one catalyst has yet been made to possess all of these desirable properties. Some catalysts are nonattritable yet they possess relatively poor thermal and steam stabilities. Other catalysts have been prepared which have excellent initial activity; yet when once deactivated through use in cracking operations, they are not readily reactivated. No known silica-magnesia catalyst has good thermal stability.

The preparation of a silica-magnesia catalyst is a subtle process. It involves the formation of complex silica-oxygen-magnesium structural combinations that are not yet thoroughly understood from the theoretical standpoint. The methods of preparing these catalysts are generally similar; the resultant products are surprisingly dissimilar.

It has been known to begin the preparation of silica-magnesia catalyst with the formation of a silica gel. For instance, an alkali metal silicate such as sodium silicate can be contacted with a mineral acid such as sulfuric acid to form a silica hydrogel. Conventionally, this hydrogel is washed free of alkali metal ion impurities and subsequently combined with magnesium in some form. Washing before combination with magnesium is not without difficulty, since small semi-colloidal particles may blind the filter cloth during the operation.

One such catalyst involves the preparation of a silica hydrogel, washing the hydrogel, and compositing by granulation this washed hydrogel with magnesia and water. The granulated product is homogenized through a colloid mill and the resultant mixture is aged at elevated temperatures for 24–72 hours. In another well-known preparation, washed hydrogel is slurried with magnesia and water. The slurry is converted to a gel and dried and activated for subsequent use. Such general preparations are suggestive, but they are by no means didactic in developing catalysts suitable to surmount the exacting problems of modern catalytic cracking.

Two of the most stringent requirements of a cracking catalyst are good equilibrium activity and good selectivity. Activity is a measure of the ability to crack; in other words, it refers to the quantity of hydrocarbons converted during the cracking operation. Selectivity is the yardstick of quality; it defines the type of hydrocarbons produced by the cracking unit. Selectivity is generally expressed in terms of the carbon factor and gas factor. These "so-called" factors are actually ratios. They compare the relative amount of coke and gaseous hydrocarbons formed while using a test catalyst to the amount of these products formed when a standard catalyst is in use. These terms will be more specifically defined in connection with my ensuing discussion.

During a normal cracking operation, the catalyst is contacted with petroleum oil at a temperature of 600–1100° F. In the course of this operation, some of the carbon that is formed "lays down" on the surface of the catalyst and impairs its activity. To reactivate a catalyst, the usual procedure is to calcine or to burn off these carbon deposits. Successful reactivation depends upon the pore volume and pore diameter and to an extent, the attrition resistance of a given catalyst.

Carbon "lay down" and the nature of the catalyst pores are closely inter-related. Catalysts having small pore structures (as determined by the pore volume and pore diameter) may exhibit considerable initial activity, but their effectiveness is short-lived. The carbon deposits partially block or seal the pore openings; the catalyst activity decreases concomitantly.

Methods of controlling the pore size of silica gel are well known. For example, it has long been a practice to treat silica hydrogel at elevated temperatures up to 212° from one to several days to increase the size of the pore openings. An equally common practice has been to displace the water within the hydrogel with an organic solvent and evaporate the solvent at substantially atmospheric conditions.

In recent years, the incorporation of a small amount of fluorine or fluoride in a catalyst has been tried in an effort to produce an improved catalyst. Apparently, catalysts thus treated are more easily reactivated by calcining. One such catalyst involves the preparation of an acid silica sol and the addition of hydrofluoric acid or an alkali metal fluoride to this sol. Certain other fluorine-containing catalysts are prepared by compositing mixtures of silica, alumina, aluminum fluoride, magnesium oxide, and magnesium fluoride. It has been noted that hydrofluoric or fluosilicic acid may be added to fresh catalysts to improve their activity. However, such benefits are not permanent because of the vaporization of the fluoride during cracking operations.

Producing a silica-magnesia catalyst having a suitable bulk density has long been a troublesome problem for prior art investigators. It has been generally found that low density catalysts have heretofore lacked physical strength, while those of high density exhibit poor regenerability. Various methods have been suggested for overcoming undesirable features by precisely controlling the density of the catalyst by the use of a hot aging treatment before drying. It has been suggested, for instance, that the silica hydrogel spheres be commingled with magnesium hydroxide in the presence of ammonium carbonate. The silica-magnesia complex thus formed is treated for about six hours at 200° F. to effectively increase the bulk density of the product. Such a product appears to be low in fines and strong in physical characteristics, yet it possesses a somewhat reduced activity.

The well-known process of Nicholson and Wilson described in U.S. Patent No. 2,685,569, describes a method of preparing a silica-magnesia catalyst by mixing a silica gel with a colloidal magnesia-magnesium chloride complex. The hydration of the magnesia causes a swelling of the pores of the material. The resulting catalyst has excellent carbon burnability properties that facilitate the reactivation of the catalyst. This catalyst, however, has somewhat limited thermal stability.

In summary, silica-magnesia catalysts are well known. Desirable properties such as good equilibrium activity, good steam stability, a stable pore structure, and good regenerability have from time to time been individually evidenced as a characteristic of a silica-magnesia catalyst. However, it is significant to note that no one catalyst has collectively possessed all of these desirable attributes. It is for this reason that silica-magnesia catalysts to this day have not been competitive with silica-alumina catalysts in the field of catalytic cracking.

I have discovered a novel process for making a new silica-magnesia catalyst that possesses all of these desirable attributes, and which, in addition, is thermally stable.

It is, therefore, an object of my invention to prepare by a novel method a new silica-magnesia catalyst that is characterized by high thermal stability, excellent steam stability, improved carbon burnability, and good equilibrium activity.

It is a further object of my invention to present an improved silica-magnesia cracking catalyst that provides higher yields of high octane hydrocarbon products which boil in the range of gasoline.

In accordance with the present invention, the initial step in preparing my novel catalyst consists of intimately contacting a colloidal dispersion of hydrated magnesia and magnesium salt with a silica hydrogel.

The silica gel for use in my process may be prepared according to conventional procedures. An alkali metal silicate such as sodium silicate may be used. Sodium silicate having a silica:soda ratio of about 3.3:1 and an $SiO_2$ content of 5 to 10% by weight is quite suitable.

Silica gel formation occurs when sodium silicate is contacted with a mineral acid such as sulfuric acid. Other strong acids, such as HCl are equally adequate. I have found it to be desirable to neutralize the sodium silicate in two stages. For example, I contact sodium silicate with sufficient sulfuric acid to form a hydrogel structure in which the remaining unneutralized sodium silicate is supported. After a short time, I add additional sulfuric acid to neutralize up to about 80% or more of the sodium silicate. In preparing my novel catalyst, I have found it convenient to work with alkaline hydrogels, although by no means is my invention restricted to such gels. Ordinarily, I prefer to complete my partial neutralization procedure with the sodium silicate prior to mixing with the colloidal hydrated magnesium oxysalt composition described hereafter. During gelation, I find it desirable to constantly disperse the gel particles. A highly dispersed silica gel has a greater proclivity for chemical combination with the magnesium complex. My partial neutralization procedure facilitates the dispersion of the gel particles by avoiding the immediate formation of a firm gel.

The starting materials for preparing my colloidal dispersion of hydrated magnesia and magnesium salt are by no means limited. Patent No. 2,685,569, of Nicholson and Wilson, suggests that such a colloidal dispersion can be prepared by mixing magnesium salts with magnesia. Magnesia suitable for use in this invention may be obtained from many sources (e.g., magnasite, dolomite, or magnesium salts derived from sea water). It is generally true that the swelling properties of the magnesia when mixed with solutions of magnesium salt will depend upon the origin (natural or synthetic), physical and chemical composition of the raw material, and the physical state and degree of purity of the calcined magnesia. For the purposes of the present invention, I have found it preferable to use a colloidal dispersion of magnesium sulfate and magnesia.

In preparing my colloidal complex, I add rapidly a quantity of suitable magnesia (MgO) to a solution of magnesium sulfate. Dispersion of this complex is important, since a uniform dispersion provides a more reactive form of magnesium for subsequent combination with the silica gel.

For best control of the dispersion of the colloidal particles during hydration of the magnesium oxysulfate, care should be taken in the mixing of the magnesia with the magnesium sulfate solution to avoid the addition of excessive amounts of water too early in the mixing operation. If excessive water is added at this stage the gelatinous mass begins to break down and free water separates. Effective control of this mixing operation also depends upon careful regulation of the reaction temperature and continuous agitation of the colloidal complex. In general, high temperatures will result in a greater degree of dispersion. I have found it preferable to maintain the temperature at under 140° F. and agitate thoroughly to obtain a uniform colloidal dispersion. As the mixture begins to thicken, I add additional water to prevent solidification. By the addition of water, I am able to maintain a dispersed mass and avoid solidification and lumping.

The ratio of magnesia to magnesium sulfate in my preferred mixture may vary widely. I have found it convenient, as a matter of practice, to prepare an initial dispersion having a magnesia to magnesium sulfate ratio of about 5:1 (analogous to that described in U.S. Patent No. 2,685,569 by Nicholson and Wilson). When the tendency of my dispersion to thicken has substantially subsided, I add additional magnesia along with more water as required to prevent thickening. Using this build-up technique, I can eventually increase my magnesia to magnesium sulfate ratio to about 8:1 or higher.

The concentration of my initial magnesium sulfate solution and the amount of additional water for controlling the viscosity during my step-wise preparation of the colloidal dispersion can be varied according to the type of magnesia selected for the process and the attributes which are desired for the final catalyst.

At this point in my discussion, it is well to emphasize the degree of variation that I can produce in my final catalyst by a controlled adjustment of preparation conditions of the silica gel and the magnesium oxysalt complex. Although my range of selection may vary widely, by precise control of the preparation variables, I can "tailor-make" my catalysts.

The results of prior art investigations emphasize the need of a large pore volume and a large pore diameter to obtain in good carbon burnability characteristics. I have found it necessary to control the pore size of the silica gel in its preparation step before the addition of the magnesia-magnesium salt complex. I have found that it might be helpful to control the pore size of the magnesia within the colloidal dispersion. It is generally known that high temperature and aging during the preparation of a silica gel increases the pore size of the gel, I have found that I obtain a very desirable pore structure by controlling the temperature at about 80° F. to 120° F. during the gel formation step. By the step-wise neutralization of the sodium silicate, I obtain a freely fluid gel mass that is highly suitable for a slurry process. The hydration of magnesia during the formation of my colloidal magnesium oxysalt dispersion enables me to obtain a large port structure of the particles within the dispersion. The control of the pore diameter and pore volume of the silica is of primary importance, since the silica is present in greater quantity in my novel catalyst.

The magnesium oxysalt complex is maintained at a temperature somewhat below 150° F. for a period of about an hour after its formation. Agitation is continuous to keep the complex well dispersed and to prevent coagulation. The pH of the colloidal dispersion at this point is about 8.8 or lower.

The colloidal complex magnesium oxysulfate and the unwashed alkaline silica gel are mixed to form a gelatinous mass comprising what is believed to be a complex magnesium silicate. When the magnesium oxysulfate is mixed with my alkaline gel, which contains substantial sodium ion impurity, I derive a two-fold beneficial effect. First, the free sodium ions and the sulfate ions (peferably in slight excess) combine to form a soluble sodium sulfate which may be drained and washed free of my silica-magnesium complex. Thus, I am able by a simple expedient to eliminate sodium ions from my complex mixture. It is well known, of course, that the presence of such ions has a deleterious effect on the final catalyst. Second, the affinity of the sodium and sulfate ions encourages the very desirable interaction of the silica with the colloidal dispersion of magnesium oxysulfate. Precaution must be taken to avoid reversal of the formation reaction of the magnesium oxysulfate complex. A rapid interaction between silica and the oxysulfate tends to prevent any such reversion from occurring.

The relative amounts of silica gel and magnesium oxysulfate complex are regulated to give approximately 20–35% MgO in the final catalyst. By carefully controlling the amount of magnesium sulfate in the complex, I am able to have available sufficient sulfate ions to react with the free alkali ions in the silica gel.

The slurry containing the silica-magnesia complex is held for a short time at ambient temperature with agitation. It is then filtered to remove the soluble sodium sulfate. After the filtration operation, I reslurry the complex in aqueous solution containing either a magnesium salt such as magnesium sulfate, sulfuric acid, or ammonium sulfate. In the preferred embodiment of my invention, I have found it desirable to use a magnesium salt or agent capable of producing magnesium ions for this purpose. It is well to note that an excess of water during the reslurry operation should be avoided, to produce a better integration between the magnesium ions and the silicate. The reslurry facilitates the removal of the undesirable impurities and serves also to lower the pH of the mixture. I find it desirable to keep the pH of the complex below 8.6. A stoichiometric excess of sulfate ion (or other anion) over the free alkali metal ions is essential in order to repress the formation of insoluble sodium fluoride during the subsequent fluoride addition step (discussed hereafter).

Experience has shown that a short aging period at an elevated temperature of about 140–150° F. is essential in order to obtain the final required properties of the catalyst. I prefer to limit this aging period to from 2–3 hours to obtain a catalyst that will have a compacted density of from 30–33 lbs. per cubic foot. By no means, however, is my invention limited to this low density catalyst. For instance, a catalyst of medium density, that is to say, one having a density of from 33–37 lbs. per cubic foot can be obtained if I age from 3–4½ hours. An aging period over 4½ hours produces a higher density catalyst (over 37 lbs. per cubic foot).

It is understood that these specific bulk density values will remain true only for a particular embodiment of my invention. In other words, they represent variations which can be obtained by altering the aging time of the silica-magnesia complex if all other conditions of my process are held constant. The bulk density of the final product is also affected by the nature of the silica gel, the conditions of gelation, and the solids content of the feed to the spray dryer.

The change in particle density (as indicated by a change in compacted density) may be caused by complex formation during the aging process. Care must be taken to control the period of aging since the pore diameter is inversely related to the bulk density. Uncontrolled aging has also resulted in loss of available magnesium ions for the final catalyst according to prior art investigators. I have been able to overcome any such tendency by making available free magnesium ions with the addition of a magnesium salt during the reslurry step. The pH of the complex slurry is maintained at below 8.3. The aforementioned densities are purely exemplary since a catalyst having a compacted or bulk density ranging from 28–55 lbs. per cubic foot is within the purview of my invention.

After aging, the slurry is filtered without cooling. The filter cake is then dispersed in water to form a thick slurry. To this slurry, I add a quantity of a solution containing dissolved fluorine at a concentration sufficient to impregnate the silica-magnesia catalyst with from 0.5–5.0 weight percent of residual fluorine in the catalyst. I selected HF solution for my preferred mode of operation, but this is merely suggestive and by no means limited. Any soluble fluoride that preferentially forms an insoluble salt with magnesium ions so as to be retained in the mass subsequent to washing, may be used. The use of a soluble fluoride permits maximum dispersion of the fluoride ion within the catalytic mass before chemical combination occurs. $H_2SiF_6$, $(NH_4)_2SiF_6$, $NH_4F$, and $NH_4HF_2$, are suitable for this purpose. When HF is used, it may be contained in sufficient water of dilution to control fuming.

It is preferable that I incorporate fluorine into the mass at this point to obtain better dispersion. Experience has shown that attempts to add a soluble fluoride before the removal of some of the free alkali metal ions results in the formation of insoluble sodium fluoride within the catalytic mass. The alkali metal ions are thus retained in the final catalyst. The presence of such impurity in the final catalyst cannot be sanctioned.

The incorporation of fluorine in the catalyst stabilizes the structure for operation at high temperature. It is also believed that the presence of fluorine in a catalytic mass results in the improvement of the octane rating of the gasoline fraction produced during the cracking reaction.

It is well to note at this point that an excess of water should be avoided during the formation of this slurry to prevent the decomposition of the silica-magnesia complex. The slurry can then be spray dried in a conventional manner. It is obviously desirable to have a maximum of solids in the feed to the spray dryer for reasons of economy (viz.: gas usage, required reactor temperature, etc.). After spray drying, the catalytic mass is washed to remove any $Na_2O$ and sulfate ions which may be present. Under controlled conditions, ammonium sulfate wash may be suitable for this purpose, but care must be taken to avoid removal of magnesium ions. A base exchange treatment with magnesium sulfate is also suitable.

The catalytic mass is redried and may be activated as necessary to yield the ultimate catalyst. Variation of the conditions of drying and activation have some effect on the attritability of the catalyst. Experience has shown, however, that spray drying conditions affect the properties of the final catalyst to a much greater extent than the final drying conditions.

My invention is further illustrated by the following non-limiting examples:

EXAMPLE I

A sample of my novel catalyst was prepared for testing purposes according to the following procedure:

36,000 cc. of $Na_2SiO_3$ solution (having a silica:soda ratio of 3.3:1 and containing 35.5 g./l. of $Na_2O$) were contacted with 11,900 cc. of 7% $H_2SO_4$. The reaction temperature was controlled at 90° F. Gelation occurred after 30 minutes; the pH of the partially gelled mass at this time was 10.7. After 10 minutes, I added 9,900 cc. additional of 7% $H_2SO_4$ to neutralize about 80% of the $Na_2O$ present. The pH at this point was measured as 10.2. During gelation, the gel particles were dispersed with continuous agitation. In addition, a centrifugal pump was used to recirculate the gelled mass to provide more complete dispersion. The hydrogel was aged for one hour with continuous circulation at a carefully controlled temperature of 90° F. The pH of the mass gradually increased from 9.5 to 9.8.

Concurrent with the silica gel preparation a magnesium oxysulfate complex was prepared by rapidly adding 1000 g. of a suitable magnesium oxide (95% thru 325 mesh) to 3,000 cc. of an aqueous $MgSO_4$ solution (1.16 specific gravity) at 140° F. with continuous agitation. A portion of the mix was recirculated to insure the formation of a uniform colloidal dispersion. As the mixture began to thicken, 7,000 cc. of water at 140° F. was added to prevent solidfication. After the tendency to thicken had substantially subsided, I added 400 g. of additional MgO along with 2500 additional cc. of water. The colloidal dispersion was aged for one hour with continuous agitation. The pH of the mixture was 8.8.

The magnesium oxysulfate colloidal dispersion was then mixed with the previously prepared silica gel at ambient conditions. The mixture was held for one hour with continuous agitation at a pH of 9.0. The slurry was then filtered to recover the silica-magnesia complex.

The filter cake containing the silica-magnesia complex was reslurried in 15,000 cc. of 5° Bé. aqueous solution of $MgSO_4$. The pH of this slurry was measured at 8.55. The slurry temperature was increased to 140–150° F. and carefully maintained at this level for 2½ hours with constant agitation. The pH subsequent to aging was about 8.2. The slurry was filtered without cooling.

The filter cake was dispersed in 5000 cc. of water to form a thick slurry to which I added 240 g. of 50% HF solution. The pH of the slurry at this point was 7.8. The fluorinated mass was then spray dried, and the spray dried product washed with ammonium sulfate to remove $Na_2O$ and $SO_4$ ions. The catalytic mass was then dried and reactivated to produce the ultimate catalyst. This catalyst is referred to hereunder as Test Sample A. Its catalytic properties are further described in connection with Table I which is presented for the purpose of demonstrating the improved silica-magnesia catalyst obtained by my novel process.

Test Sample A had the following chemical analysis: MgO, 26.21%; F, 1.43%; $Na_2O$, 0.021%; and $SO_4$, 0.34%.

EXAMPLE II

The entire procedure of Example I was duplicated with the one exception that the slurry formed with the 5° Bé. magnesium sulfate solution and the silica-magnesia complex was held at an elevated temperature for four hours. The pH after the fluorine addition step was measured as 7.7. The subsequent spray drying, washing, drying, and activating steps were all repeated precisely as described in Example I. This catalyst is referred to hereafter as Test Sample B.

Test Sample B had the following chemical analysis: MgO, 25.71%; F, 1.46%; $Na_2O$, 0.024%; and $SO_4$, 0.26%.

EXAMPLE III

The entire procedure of Example I was duplicated with the one exception that the slurry formed with the 5° Bé. magnesium sulfate solution and the silica-magnesia complex was held at an elevated temperature for four and a half hours. The pH after the fluorine addition step was measured as 7.7. The subsequent spray drying, washing, drying, and activating steps were all repeated precisely as described in Example I. This catalyst is referred to hereafter as Test Sample C.

Test Sample C had the following chemical analysis: MgO, 25.53; F, 1.45; $Na_2O$, 0.018, and $SO_4$, 0.36.

EXAMPLE IV

The entire procedure of Example I was duplicated with the one exception that the slurry formed with the 5° Bé. magnesium sulfate solution and the silica-magnesia complex was held at an elevated temperature for five and a half hours. The pH after the fluorine addition step was measured as 7.6. The subsequent spray drying, washing, drying, and activating steps were all repeated precisely as described in Example I. This catalyst is referred to hereafter as Test Sample D.

Test Sample D had the following chemical analysis: MgO, 25.96; F, 1.59; $Na_2O$, 0.016; and $SO_4$, 0.15.

The particle size data for the four test samples are summarized in Table I. It is understood that the size of the microspheres is important when a fluid bed catalyst is contemplated. Best fluid action is obtained when the particle size ranges from 30 to 90 microns. However, my invention is by no means limited to a fluid bed type catalyst. My novel catalyst can be manufactured in bead or pellet form, or as a ground product.

*Table I*

| | A | B | C | D |
|---|---|---|---|---|
| Micron Size: | | | | |
| 0–20 | 2.5 | 1.5 | 1.2 | 1.1 |
| 20–40 | 7.5 | 7.5 | 6.8 | 5.9 |
| 40–80 | 56.0 | 52.0 | 54.0 | 43.0 |
| plus 80 | 34.0 | 39.0 | 38.0 | 50.0 |
| Average Particle Size | 74 | 74 | 73.8 | 81 |

The improvement in my novel silica-magnesia catalyst is cogently demonstrated by the comparative data in Table II. Table II is an evaluation of the important attributes of a cracking catalyst. It presents comparative data between my novel silica-magnesia catalyst (Test Samples A, B, C, and D), a commercial silica-magnesia catalyst, and two commercial grade silica-alumina catalysts, one containing 13% $Al_2O_3$ and the other 25% $Al_2O_3$ combined with silica. The commercial silica-magnesia catalyst comprised 30% magnesia and about 70% silica. It was prepared by the well-known process of Ahlberg, Baral, and Tongue described in U.S. Patent No. 2,680,100. These seven catalysts are compared as to their respective activity, selectivity, surface area, pore volume, average pore diameter, attrition index, and compacted density.

The well-established activity and selectivity standards of "Distillate Plus Loss" ($D+L$), carbon factor, and gas factor are used as a yardstick of catalyst performance. The $D+L$ of a catalyst is determined by a standard test fully described in the literature (Ivey and Veltman, Petroleum Refiner, June 52). Briefly stated, a light East Texas gas oil feed stock is cracked on the test catalyst at 850° F., a space velocity of 0.6 volume of oil per volume of catalyst per hour and atmospheric pressure and 100 cc. of the liquid product is distilled in standard equipment. The amount of gasoline distilled at 400° F. is designated as the distillate or D, and the residue is R. The value 100−(*D*+*R*) is called loss or L. The sum of *D*+*L* is a criterion for catalyst activity. It varies from about 10–20 for deactivated catalysts up to about 25–50 for reactivated or fresh cracking catalysts.

The carbon factor is the ratio of carbon produced by the test catalyst to that produced by an uncontaminated silica-alumina catalyst adjusted to the same activity by steam or heat treatment. It ranges from below 1.0 for fresh catalyst to about 1.5–2.0 or more for used catalysts. The ratio of dry gas (cubic foot per barrel of oil) produced by the test catalyst to the dry gas produced by the uncontaminated catalyst of the same activity is the gas producing or gas factor. Both the gas factor and the carbon factor are used to measure catalyst selectivity. Low gas factors and low carbon factors are indicative of better catalysts.

The steam stability of the catalysts is determined by pretreatment of them for three hours at 1250° F. in the absence of steam, followed by subsequent treatment for 24 hours at 1050° F. with steam at a pressure of 60 lb. per square inch gauge. After the steam treatment, the catalyst is tested for activity.

The thermal stability of the catalyst is determined by calcining (thermal pretreatment) the catalyst for three hours at a specified temperature, followed by a subsequent activity test. The thermal stability of each of the four types of catalyst (as presented in Table II) was determined at 1000° F., 1350° F., and 1550° F.

A more stringent test for determining the stability of a catalyst comprises treating for 24 hours at 1050° F. with steam, subjecting the catalyst to a cracking cycle, followed by subsequent thermal treatment for 3 hours at 1350° F. The catalyst is then tested for activity. Comparative data, using this steam-thermal test, are shown in Table II for each sample of my novel catalyst (A–D), the commercial silica-magnesia catalyst, and the 25% $Al_2O_3$ silica-alumina catalyst.

The comparative effects of increased temperature and steam on the surface area, pore volume and average diameter of each of the catalysts are also presented in Table II.

The surface areas, pore diameters, and pore volumes were determined by the conventional Brunauer-Emmet-Teller method involving the nitrogen adsorption isotherm at liquid nitrogen temperature, with the exception of the pore volume data for my novel catalysts. These data were obtained using the comparable air-permeability method (see T. C. Carmen, Journal Society of Chemical Industries, vol. 57, 1938, pp. 225–234).

Each of the catalysts was tested for attrition resistance, after activation, by a standard test known as the CAE roller test, in which a sample of catalyst is attrited by a blast of air for a specified length of time under narrowly defined conditions. The size analysis of the catalyst is made before and after the attrition to determine the increase of the fraction of catalyst having a particle size between 0–20 microns. The attrition index is expressed as the percentage increase in 0.20 micron material and is determined by the following formula:

$$\text{Attrition index} = \frac{\text{percent 0–20 after attrition} - \text{percent 0–20 before attrition}}{\text{percent+20 material originally present}}$$

Compacted (bulk) density for each of the catalysts was determined by the following procedure:

A portion of catalyst was activated for three hours at 1250° F. A 100 g. sample of catalyst was weighed out; the static charge of the particles was dissipated by spreading the sample on a dry surface for a half hour. The sample was poured into a 250 ml. graduate cylinder and the cylinder was tapped until it reached constant volume. The density of the final volume of catalyst was then determined.

*Table II*

CATALYTIC PROPERTIES

| | Test Samples | | | | Commercial Catalysts | | |
|---|---|---|---|---|---|---|---|
| | "A" | "B" | "C" | "D" | Silica-Magnesia | 13% $Al_2O_3$ Silica-Alumina | 25% $Al_2O_3$ Silica-Alumina |
| Activity: *D*+*L*: | | | | | | | |
| 1,000° F. | 39.3 | 46.7 | | | 53 | 60.2 | 52.9 |
| 1,350° F. | 47.8 | 49.0 | -------- | -------- | 58 | 58.0 | 51.1 |
| 1,550° F. | 33.6 | 34.9 | 32.1 | 28.7 | 2 | 51.6 | 47.3 |
| Steam at 1,050° F. | 38.8 | 37.3 | 37.8 | 38.2 | 44 | 31.8 | 35.3 |
| Steam—Thermal | 46.6 | 46.5 | 44.7 | 44.4 | -------- | -------- | 34.9 |
| Selectivity: | | | | | | | |
| Carbon Factor— | | | | | | | |
| 1,000° F. | 1.06 | 1.0 | | | 0.7 | 0.8 | 0.8 |
| 1,350° F. | 0.80 | 0.85 | -------- | -------- | 0.5 | 0.8 | 0.8 |
| 1,550° F. | 0.62 | 0.72 | 0.91 | 1.05 | -------- | 0.8 | 1.0 |
| Steam at 1,050° F. | 0.78 | 0.73 | 1.01 | 1.04 | 0.8 | 1.0 | 1.0 |
| Steam—Thermal | 0.89 | 0.78 | 0.78 | 1.05 | -------- | -------- | 0.96 |
| Gas Factor— | | | | | | | |
| 1,000° F. | 0.87 | 0.64 | | | 0.9 | 1.0 | 1.2 |
| 1,350° F. | 0.63 | 0.77 | -------- | -------- | 0.7 | 0.8 | 1.0 |
| 1,550° F. | 0.77 | 0.71 | 0.74 | 0.82 | -------- | 0.9 | 1.0 |
| Steam at 1,050° F. | 0.59 | 0.82 | 0.70 | 0.88 | 0.9 | 1.0 | 1.0 |
| Steam—Thermal | 0.77 | 0.80 | 0.77 | 0.76 | -------- | -------- | 0.87 |
| Surface Area $M^2$/g.— | | | | | | | |
| 1,250° F. | 490 | 507 | 493 | 502 | 541 | 504 | 354 |
| 1,550° F. | 246 | 232 | 224 | 207 | 15 | 360 | 283 |
| Steam | 448 | 452 | -------- | -------- | 451 | 148 | 174 |
| Pore Volume Ml./g.— | | | | | | | |
| 1,250° F. | 0.77 | 0.64 | 0.56 | 0.46 | 0.36 | 0.65 | 0.97 |
| 1,550° F. | 0.56 | 0.44 | 0.41 | 0.26 | 0.03 | 0.44 | 0.87 |
| Steam at 1,050° F. | 0.74 | 0.61 | -------- | -------- | 0.34 | 0.56 | 0.83 |
| Average Pore Diameter, A.— | | | | | | | |
| 1,250° F. | 63 | 50 | 45 | 37 | 30 | 52 | 109 |
| 1,550° F. | 90 | 76 | 73 | 50 | 800 | 49 | 123 |
| Steam at 1,050° F. | 66 | 54 | -------- | -------- | 30 | 151 | 191 |
| Attrition Index—Percent Fines Formed | 26.9 | 19.7 | 14.5 | 6.6 | 6 | 14.6 | 25.1 |
| Compacted Density—Lbs./Cubic Foot | 32 | 36 | 38 | 41 | 53 | 38.0 | 30 |

Several significant factors should be noted from Table II. First, my novel catalyst is far superior to the standard silica-magnesia catalyst in its thermal stability at 1550° F. At this temperature, the new catalyst can be readily compared with a commercial silica-alumina catalyst. Second, my catalyst has a steam activity generally superior to silica-alumina catalyst. Third, the low carbon factor and low gas factor of my novel catalyst indicates excellent selectivity. Fourth, the surface area of my novel catalyst is virtually unaffected by steam, which is generally true of silica-magnesia catalysts. Note the great decrease in the surface area after steaming the commercial silica-alumina catalysts. Compare also the steam-thermal test. Fifth, my novel catalyst is quite suitable from the standpoint of its attrition index. It is generally true that the attrition index varies inversely with the compacted density. A catalyst having an attrition index below 30 is considered to be satisfactory. Sixth, it should be noted that the density of my catalyst is much lower than that of the commercial silica-magnesia catalyst. Although Samples A–D range in density from 32 to 41 lbs./ft.$^3$, the decrease in activity with increase in density is only slight. Seventh, the pore volume and average pore diameter of my catalysts are generally comparable with respect to those same properties to the silica-alumina catalysts. My new catalysts possess greater pore volume and greater average pore diameter than the commercial silica-magnesia catalyst.

My novel catalyst shows considerable improvement over both the silica-alumina catalyst and the standard silica-magnesia catalyst. In order to more clearly demonstrate the superiority of my catalyst, I will discuss separately its improved properties with reference to each of the standard catalysts.

My catalyst is superior to commercial silica-alumina catalysts, primarily because it possesses a more even activity over a wide temperature deactivation range. Commercial cracking catalyst plants are designed for a particular charge rate. Their facilities are set up to handle a given volume of gas and coke produced during the cracking operation. If the initial activity of the catalyst is too high, an overage of gas and coke are produced which results in an overload on the fractionating towers, the compressors, and other equipment. In this instance, the charge rate of petroleum stock must be reduced so that the resulting output of gas and coke is lowered to a rate that the cracking plant can conveniently handle. The activity of my fresh catalyst is not excessive; furthermore, it shows no appreciable loss of activity during service. In both respects, it is superior to a silica-alumina catalyst. My novel catalyst has a pore diameter comparable to that of silica-alumina catalyst. Unlike the silica-alumina catalyst, its pore structure can be precisely controlled. My catalyst shows a tremendous advantage of steamed surface area, which gives improved carbon burnability characteristics and facilitates regeneration of the catalyst. My novel catalyst shows a higher surface area per unit activity than the silica-alumina catalysts. Such a comparison is significant as it indicates better carbon burnability and more resistance to poisoning by sulfur and soluble metals such as iron, nickel, vanadium, and copper.

My catalyst has better equilibrium activity than the commercial silica-magnesia catalyst (the advantages of which I have already discussed in the comparison with silica-alumina catalyst). The pore diameter and pore volume for my novel catalyst are greater than those of the silica-magnesia catalyst. It is believed that greater pore diameter results in a higher octane fraction of low boiling hydrocarbons being produced. It also improves the carbon burnability characteristics and the tendency of the catalyst to resist poisoning. Using my novel process, I am able to control pore diameter without an appreciable sacrifice in surface area. The thermal stability of my novel catalyst at high temperatures is obviously vastly superior to that of the commercial silica-magnesia catalyst. My catalyst is slightly more attritable, which facilitates its withdrawal from a commercial cracking unit. It is also believed that a slight degree of attrition militates against the tendency of the catalyst to become poisoned.

It should be pointed out that I have concentrated my efforts on the production of a low density catalyst. The advantages of such a catalyst are two-fold. First, I am able to obtain a higher activity maintenance with lower catalyst consumption. Second, a low density catalyst shows an improved burning rate during regeneration, since the size of the pore structures varies inversely with the density, and a large pore structure facilitates burn off.

I claim:

1. The method of preparing a $SiO_2$—MgO catalyst which comprises the steps of reacting a colloidal dispersion of hydrated magnesia and magnesium oxysalt with silica hydrogel, recovering the resulting silica-magnesia complex therefrom, dispersing said complex into an aqueous slurry containing free magnesium ions, thereby increasing the content of free magnesium ions, aging said slurry at an elevated temperature, separating the solids therefrom, reslurrying said solids with a solution containing dissolved fluorine, at a concentration sufficient to impregnate said silica-magnesia complex with from 0.5 to 5.0 wt. percent of residual fluorine in said catalyst, and washing and drying said composite.

2. A method of preparing a silica-magnesia catalyst comprising forming a composite of hydrated magnesia-magnesium oxysalt in a colloidal silicic acid, filtering said composite, forming thereof an aqueous slurry having an increased content of free magnesium ions, aging said slurry at an elevated temperature for a time sufficient to induce a compacted density of 25–55#/ft.$^3$ in said silica-magnesia catalyst, recovering the solids from said slurry, commingling with said solids a soluble fluoride in an amount to yield a residual fluorine content of 0.5–5.0 wt. percent in said catalyst and thereafter washing and drying said composite.

3. The method of preparing a $SiO_2$—MgO cracking catalyst comprising commingling with an alkaline silica hydrogel an aqueous dispersion of hydrated magnesia and a magnesium oxysalt; filtering the resulting composite, dispersing said composite into an aqueous slurry containing free magnesium ions, thereby providing in the resulting mixture a stoichiometric excess of magnesium ions over alkali metal ions; recovering the solids from said slurry, commingling with said solids a solution capable of yielding residual fluoride to said mixture in an amount equal to 0.5–5.0 wt. percent of the final activated catalyst solids in said mixture; and drying, washing, and calcining the resulting mixture.

4. The method of preparing a $SiO_2$—MgO catalyst which comprises the steps of reacting a colloidal magnesium oxysalt with partially neutralized alkali metal silicate, filtering the resulting mass to recover the silica-magnesia, dispersing said mass into an aqueous slurry containing free magnesium ions, aging the resulting slurry to adjust the compacted density of the final catalyst to a value of 28–42#/ft.$^3$, recovering the solids from said slurry, contacting said solids with an aqeous solution of a member of the group consisting of HF, $H_2SiF_6$, $MgSiF_6$, $(NH_4)_2SiF_6$, $NH_4F$, $NH_4HF_2$, and $MgF_2$ at a concentration sufficient to impregnate said silica-magnesia composite with from 0.5–5.0 wt. percent of fluorine, and washing and drying said composite.

5. A method according to claim 4 wherein the magnesium oxysalt is magnesium oxysulfate.

6. A method according to claim 4 wherein the solids are contacted with an aqueous solution of HF.

7. A silica-magnesia cracking catalyst characterized by improved regenerability, thermal stability, and cracking activity consisting essentially of 65–80% of silica, 20–30% of magnesia, and 0.5–5.0% of fluorine, and being further characterized by a surface area of at least 150 m.$^2$/gm. and an activity of at least $25D+L$ after treatment for three hours at 1550° F.

8. A silica-magnesia cracking catalyst characterized by improved regenerability, thermal stability, and high activity consisting essentially of 65–80% of silica, 20–30% magnesia, and 0.5–5.0% of insoluble combined fluorine and having an attrition index of less than 30%, a compacted density of 28–42#/ft.$^3$, and being further characterized by a pore volume of 0.4–1.0 ml./gm., a pore diameter of 35–100 angstrom units after thermal pretreatment for three hours at 1250° F. and a surface area of at least 150 m.$^2$/gm., a pore volume of at least 0.25 ml./gm., and an activity of at least $25D+L$ after thermal pretreatment for three hours at 1550° F.

References Cited in the file of this patent

UNITED STATES PATENTS

| | | |
|---|---|---|
| 2,479,109 | Haensel | Aug. 16, 1949 |
| 2,479,110 | Haensel | Aug. 16, 1949 |
| 2,605,237 | Webb | July 29, 1952 |
| 2,623,860 | Haensel | Dec. 30, 1952 |
| 2,685,569 | Nicholson et al. | Aug. 3, 1954 |